US012786539B2

(12) United States Patent
Simon et al.

(10) Patent No.: US 12,786,539 B2
(45) Date of Patent: Nov. 3, 2026

(54) TRANSMISSION DEVICE WITH BEAM DISPLACING DEVICE FOR A DETECTION DEVICE FOR DETECTING OBJECTS, CORRESPONDING DETECTION DEVICE, VEHICLE, AND METHOD FOR OPERATING A TRANSMISSION DEVICE

(71) Applicant: VALEO SCHALTER UND SENSOREN GMBH, Bietigheim-Bissingen (DE)

(72) Inventors: Jan Christoph Simon, Bietigheim-Bissingen (DE); Bernd Bertschinger, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 367 days.

(21) Appl. No.: 18/287,749

(22) PCT Filed: Apr. 20, 2022

(86) PCT No.: PCT/EP2022/060363
§ 371 (c)(1),
(2) Date: Oct. 20, 2023

(87) PCT Pub. No.: WO2022/223582
PCT Pub. Date: Oct. 27, 2022

(65) Prior Publication Data
US 2024/0364990 A1 Oct. 31, 2024

(30) Foreign Application Priority Data
Apr. 22, 2021 (DE) ..................... 10 2021 110 294.4

(51) Int. Cl.
*H04N 23/55* (2023.01)
*G06V 20/56* (2022.01)

(52) U.S. Cl.
CPC ............. *H04N 23/55* (2023.01); *G06V 20/56* (2022.01)

(58) Field of Classification Search
CPC ...... G06V 20/56; G06V 20/586; G06V 10/25; G06V 10/44; G06V 10/764; G06V 20/588; H04N 23/55; B62D 15/0285; G02F 1/0147
(Continued)

(56) References Cited

U.S. PATENT DOCUMENTS 4,969,699 A 11/1990 Noguchi et al.
5,157,257 A * 10/1992 Geiger .................... G01S 17/95 250/338.5
(Continued)

FOREIGN PATENT DOCUMENTS

CN 105143820 A 12/2015
CN 105785343 A 7/2016
(Continued)

OTHER PUBLICATIONS

International Search Report and Written Opinion in corresponding International Application No. PCT/EP2022/060363, dated Aug. 10, 2022 (13 pages).
(Continued)

*Primary Examiner* — Masum Billah
(74) *Attorney, Agent, or Firm* — Osha Bergman Watanabe & Burton LLP

(57) ABSTRACT

The invention relates to a transmission device (22) of a detection device for detecting objects using electromagnetic scanning signals (30); a detection device; a vehicle comprising at least one detection device; and a method for operating a transmission device (22). The transmission device (22) comprises at least one signal source (36) for generating electromagnetic scanning signals (30) and at least
(Continued)

one beam displacing device (38) for displacing signal paths (42) of electromagnetic scanning signals (30). The transmission device (22) has at least two signal sources (36) which can be actuated individually so at to generate electromagnetic scanning signals (30). At least one beam displacing device (38) can be adjusted between at least two displacement states (I, II), wherein the displacement states (I, II) are assigned to different signal sources (36). In the displacement states (I, II) assigned to the respective signal sources (36), the signal paths (42) of at least two signal sources (36) lie on the outlet of the at least one beam displacing device (38) on a common main signal path (34).

16 Claims, 3 Drawing Sheets

(58) Field of Classification Search
USPC .......................................................... 348/118
See application file for complete search history.

(56) References Cited

U.S. PATENT DOCUMENTS

2014/0268352 A1 9/2014 Vethake et al.
2020/0333461 A1* 10/2020 Guo ...................... G01S 7/4815

FOREIGN PATENT DOCUMENTS

DE 102011000978 A1 8/2012
DE 102019213824 A1 3/2021

OTHER PUBLICATIONS

German Search Report in corresponding German Application No. 10 2021 110 294.4, dated Mar. 22, 2022 (5 pages).
Office Action issued in the counterpart Chinese Application No. 202280037087.2, mailed May 15, 2026 (31 pages with translation).

* cited by examiner

TRANSMISSION DEVICE WITH BEAM DISPLACING DEVICE FOR A DETECTION DEVICE FOR DETECTING OBJECTS, CORRESPONDING DETECTION DEVICE, VEHICLE, AND METHOD FOR OPERATING A TRANSMISSION DEVICE

TECHNICAL FIELD

The invention relates to a transmission device of a detection device for detecting objects by means of electromagnetic scanning signals, having at least one signal source for generating electromagnetic scanning signals and having at least one beam displacing device for displacing signal paths of electromagnetic scanning signals.

Furthermore, the invention relates to a detection device for detecting objects by means of electromagnetic scanning signals, having at least one transmission device, which includes at least one signal source for generating electromagnetic scanning signals and at least one beam displacing device for displacing signal paths of electromagnetic scanning signals, and having at least one reception device for receiving electromagnetic echo signals, which originate from electromagnetic scanning signals reflected on objects.

In addition, the invention relates to a vehicle having at least one detection device for detecting objects by means of electromagnetic scanning signals, having at least one transmission device, which includes at least one signal source for generating electromagnetic scanning signals and at least one beam displacing device for displacing signal paths of electromagnetic scanning signals, and having at least one reception device for receiving electromagnetic echo signals, which originate from electromagnetic scanning signals reflected on objects.

Furthermore, the invention relates to a method for operating a transmission device of a detection device for detecting objects by means of electromagnetic scanning signals, in which electromagnetic scanning signals are generated using at least one signal source and a signal path of at least one electromagnetic scanning signal is displaced using at least one beam displacing device.

PRIOR ART

A transmitter for light detection and ranging (LiDAR) is known from US 2020/0333461 A1. The transmitter comprises a laser source, which is configured such that it provides a native laser beam, a light collimator which is configured such that it collimates the native laser beam, in order to form an input laser beam emitted along a lateral direction, and a beam displacing device, which is configured such that it displaces the input laser beam along a vertical direction perpendicular to the lateral direction by a displacement in order to form an output laser beam, wherein the output laser beam and the input laser beam are parallel to one another.

The invention is based on the object of designing a transmission device, a detection device, a vehicle, and a method of the type mentioned at the outset, in which a transmission frequency at which electromagnetic scanning signals are transmitted can be increased.

DISCLOSURE OF THE INVENTION

This object is achieved according to the invention in the transmission device in that the transmission device includes at least two signal sources, which can be activated individually to generate electromagnetic scanning signals, at least one beam displacing device is adjustable between at least two displacement states, wherein the displacement states are assigned to different signal sources, the signal paths of at least two signal sources at the output of the at least one beam displacing device are located on a common main signal path of the transmission device in the displacement states which are respectively assigned to the signal sources.

According to the invention, at least two signal sources are provided which can be activated individually. In this way, the signal sources can be activated in succession, in particular alternately, to generate electromagnetic scanning signals. Respective displacement states of the at least one beam displacing device are assigned to the signal sources. By corresponding setting of the displacement state of the at least one beam displacing device, the signal path of the active signal source is displaced onto the common main signal path. In this way, the scanning signals of the at least two signal sources are emitted on the common main signal path. The scanning signals thus take the same path after the at least one beam displacing device, directly or indirectly, in particular via other components, such as optical systems, scanning signal deflection devices, or the like, into a monitoring region of the detection device. The monitoring region is monitored for objects using the detection device.

With a single signal source, the transmission frequency in which scanning signals can be generated in succession is limited for physical reasons. Limiting factors can be in particular limits in the provision of required electrical powers or amperages by corresponding supply components. The invention enables multiple signal sources to be activated in chronological sequence to generate respective scanning signals and each of the scanning signals to be guided onto the common main signal path by appropriate setting of the at least one beam displacing device. The transmission frequency in which scanning signals are transmitted using the transmission device can thus be increased as a whole in relation to the transmission frequency which is possible using the individual signal sources.

Detection devices according to the invention can be used in areas of use in which a correspondingly high measuring frequency, in particular a high scanning frequency, is required in the detection of objects. In particular in vehicles, high measuring frequencies are required during driving maneuvers at high speeds in order to detect objects reliably. This is possible using detection devices according to the invention.

Signal paths of electromagnetic scanning signals can be displaced using a beam displacing device. Such beam displacing devices can be designated in the English language as "beam shifters". Signal paths in the meaning of the invention are the paths on which the scanning signals propagate. A signal path is characterized by the propagation direction of the scanning signals and the spatial location. Upon a displacement of a signal path, the propagation direction of the scanning signals is maintained. Only the location of the signal path is changed upon the displacement. The original signal path and the displaced signal path extend offset in parallel to one another as a result.

At least one signal source can advantageously be an optical signal source. Optical scanning signals can be generated using optical signal sources. The optical scanning signals can be light signals, in particular laser signals. The signal sources can include or consist of lasers or laser diodes.

At least one signal source can advantageously include at least one optical system, in particular an optical lens or the like, using which the generated scanning signals can be influenced, in particular focused and/or expanded.

At least one signal source can advantageously be designed for generating optical scanning signals in the form of signal pulses. Pulsed scanning signals can be assigned to corresponding pulsed echo signals using a reception device of the detection device.

Advantageously, the detection device can operate according to a signal time-of-flight method, in particular a signal pulse time-of-flight method. Detection devices operating according to the signal pulse time-of-flight method can be designed and referred to as time-of-flight (TOF) systems, light detection and ranging (LiDAR) systems, laser detection and ranging (LaDAR) systems or the like.

Advantageously, the detection device can be designed as a scanning system. In this case, a monitoring region can be sampled, that is to say scanned, using electromagnetic scanning signals, in particular light signals. For this purpose, the propagation direction of the scanning signals can be swept over the monitoring region. At least one scanning signal deflection device can be used here.

Advantageously, the detection device can be designed as a laser-based distance measurement system. Laser-based distance measurement systems can include lasers, in particular diode lasers, as signal sources. In particular, pulsed laser signals can be transmitted as scanning signals using lasers. The laser can be used to emit scanning signals in wavelength ranges that are visible or not visible to the human eye. Accordingly, a reception device of the detection device can include a detector designed for the wavelength of the emitted scanning signals, in particular a point sensor, line sensor, or area sensor, especially an (avalanche) photodiode, a photodiode line, a CCD sensor, an active pixel sensor, in particular a CMOS sensor, or the like. The laser-based distance measurement system can advantageously be a laser scanner. Monitoring regions can be scanned in particular by pulsed laser scanning signals using laser scanners.

The invention can advantageously be used in vehicles, in particular motor vehicles. The invention can advantageously be used in land vehicles, in particular passenger vehicles, trucks, buses, motorcycles or the like, aircraft, in particular drones, and/or watercraft. The invention can also be used in vehicles that may be operated autonomously or at least semiautonomously. However, the invention is not restricted to vehicles. It can also be used in stationary operation, in robotics and/or in machines, in particular construction or transport machinery, such as cranes, excavators or the like.

The detection device can advantageously be connected to or can be part of at least one electronic control device of a vehicle or of a machine, in particular a driver assistance system and/or a chassis control system and/or a driver information device and/or a parking assistance system and/or a gesture recognition system or the like. In this way, at least a part of the functions of the vehicle or of the machine can be performed autonomously or semiautonomously.

The detection device can be used for detecting stationary or moving objects, in particular vehicles, persons, animals, plants, obstacles, roadway irregularities, in particular potholes or rocks, roadway boundaries, traffic signs, open spaces, in particular parking spaces, precipitation or the like, and/or movements and/or gestures.

In one advantageous embodiment, at least one beam displacing device can include at least one beam displacing device element, which is movable using at least one controllable actuator to set displacement states, and/or at least one beam displacing device element of at least one beam displacing device can be tiltable around at least one beam displacing device axis to set displacement states, and/or at least one beam displacing device element of at least one beam displacing device can be tiltable around two beam displacing device axes, which are in particular orthogonal to one another, to set displacement states.

At least one beam displacing device can advantageously include at least one beam displacing device element. By changing a position and/or orientation of the at least one beam displacing device element, the signal paths of the scanning signals can be displaced accordingly.

The at least one beam displacing device element can be moved using a controllable actuator. In this way, the at least one beam displacing device can be set to the corresponding displacement states.

At least one beam displacing device element can be tiltable around at least one beam displacing device axis to set displacement states. Tilting movements can be implemented easily and precisely. By tilting around a beam displacing device axis, the signal paths of the scanning signals can accordingly be displaced in one dimension. By tilting around two beam displacing device axes, the signal paths of the scanning signals can accordingly be displaced in two dimensions. By using beam displacing device axes orthogonal to one another, efficient displacement of the signal paths of the scanning signals in two dimensions can be implemented.

Advantageously, at least one beam displacing device element can be implemented as a window. Windows can be movably arranged stably in corresponding frames.

At least one beam displacing device element can advantageously be made of at least one material which is transmissive for the scanning signals, and can include at least two parallel surfaces which extend transversely to the signal path to be displaced of the electromagnetic scanning signals. In this way, the signal paths of scanning signals can be displaced in parallel by corresponding pivoting or tilting of the at least one beam displacing device element.

At least one actuator of at least one beam displacing device can advantageously include or consist of at least one electrical and/or electromechanical drive, in particular a motor, a piezo drive, a bimetallic actuator, or the like. Electric drives and electromechanical drives can be controlled using electrical control signals, in particular by means of an electrical control device or an electrical control and evaluation device.

Advantageously, at least one beam displacing device can be controlled in accordance with controls of other devices of the detection device, in particular at least one signal source, at least one reception device, and/or at least one scanning signal deflection device. In this way, measurements can be carried out more precisely using the detection device.

At least one beam displacing device and at least one other device of the detection device can advantageously be controlled using the same control signals, in particular trigger signals, and/or by means of the same control device. In this way, the control can be implemented more precisely and/or easily.

In a further advantageous embodiment, at least one beam displacing device can include at least one beam displacing device element at least partially transmissive for the electromagnetic scanning signals and/or at least one beam displacing device can include at least one beam displacing device element at least partially reflective for the electromagnetic scanning signals. In this way, the at least one beam displacing device element can be arranged more flexibly in the signal paths of the signal sources.

At least one beam displacing device element can advantageously be either reflective or transmissive. Alternatively, at least one beam displacing device element can be both partially reflective and partially transmissive. In this way, the transmission device can be designed more flexibly.

At least one beam displacing device element can advantageously consist of glass, plastic, or the like, or another type of reflective and/or transmissive material. Such materials can be easily processed, in particular molded. Furthermore, such materials are relatively inexpensive and/or robust.

In a further advantageous embodiment, the transmission device can include at least one control device, using which the at least one beam displacing device and/or the at least two signal sources are controllable. In this manner, the at least one beam displacing device and/or the at least two signal sources can be deliberately activated.

The at least one control device can advantageously be an electrical control device. In this way, the control can take place electrically. The at least one control device can be implemented in software and/or hardware.

In a further advantageous embodiment, at least one control device of the transmission device can include means using which the at least one beam displacing device and the at least two signal sources can be controlled in a manner matched with one another. In this manner, the displacement state of the at least one beam displacing device can be deliberately set on the respective active signal source.

In a further advantageous embodiment, the signal paths of the at least two signal sources can extend in parallel to one another in the propagation direction of the scanning signals in front of the at least one beam displacing device. In this way, the signal paths can each be displaced using the at least one beam displacing device by means of parallel displacements onto the main signal path.

In a further advantageous embodiment, at least one optical system can be arranged in the main signal path. Using the at least one optical system, the scanning signals can be influenced accordingly, in particular expanded and/or focused, in the propagation direction after the at least one beam displacing device.

The scanning signals can advantageously be imaged, in particular focused, using the at least one optical system on a defined region of a deflection element, in particular a mirror or the like, of a scanning signal deflection device.

Advantageously, at least one optical system can include at least one optical lens. Optical lenses can be implemented and set easily.

In a further advantageous embodiment, at least two signal sources can be identical with respect to the generated electromagnetic scanning signals and/or at least two signal sources can be different with respect to the generated electromagnetic scanning signals. In this way, the scanning signals can be adapted to the area of use of the transmission device.

Advantageously, identical scanning signals can be generated using at least two signal sources. In this way, the monitoring region can always be scanned using the same scanning signals independently of the active signal source.

Alternatively or additionally, different scanning signals, in particular scanning signals having different wavelengths, can advantageously be generated using at least two signal sources. In this way, a scope of performance of the detection device for detecting objects can be improved.

In a further advantageous embodiment, the output sides of at least two signal sources can be arranged at the same distance to at least one beam displacing device and/or the output sides of at least two signal sources can be arranged at different distances to at least one beam displacing device and/or the output sides of at least two signal sources can be arranged along a line which extends transversely, in particular perpendicularly, to the signal paths and/or the main signal path, and/or the output sides of at least three signal sources can be arranged along a plane which extends transversely, in particular perpendicularly, to the signal paths and/or the main signal path.

The output sides of at least two signal sources can advantageously be arranged at the same distance to at least one beam displacing device. In this way, equal signal times of flight can be achieved.

Alternatively or additionally, the output sides of at least two signal sources can advantageously be arranged at different distances to at least one beam displacing device. In this way, the signal sources can be arranged offset in relation to one another in a space-saving manner.

Alternatively or additionally, the output sides of at least two signal sources can advantageously be arranged along a line which extends transversely, in particular perpendicularly, to the signal paths and/or the main signal path. In this way, the signal paths can each be displaced onto the main signal path by tilting a beam displacing device element of the beam displacing device around only one axis.

Alternatively or additionally, the output sides of at least three signal sources can advantageously be arranged along a surface which extends transversely to the signal paths and/or the main signal path. The signal sources can thus be arranged flatly in a space-saving manner overall.

In a further advantageous embodiment, if at least three signal sources are arranged, the signal paths of adjacent signal sources can each extend with equal spacing. In this manner, the individual signal paths can be displaced onto the main signal path by uniform changing of the displacement states of the at least one beam displacing device. The setting of the displacement states can thus be made simpler overall.

In a further advantageous embodiment, the signal paths of at least two signal sources can extend in a plane which extends perpendicularly to a beam displacing device axis, around which at least one beam displacing device element of at least one beam displacing device is tiltable, and/or the signal paths of at least two signal sources can extend in a plane which extends parallel to a beam displacing device axis, around which at least one beam displacing device element of at least one beam displacing device is tiltable. In this way, the signal paths of the corresponding signal sources can each be displaced onto the main signal path by tilting the at least one beam displacing device element around a beam displacing device axis and/or around two beam displacing device axes, which in particular extend orthogonally to one another.

In a further advantageous embodiment, the transmission device can include at least one scanning signal deflection device, which is arranged in the main signal path of the at least one beam displacing device. The scanning signals can be deflected into the monitoring region using a scanning signal deflection device. With the aid of the at least one beam displacing device, it is possible to have the scanning signals from all signal sources strike on the same region of the at least one signal deflection device.

The transmission device can advantageously include at least one adjustable scanning signal deflection device. In this way, the propagation direction of the scanning signals in the monitoring region can be changed.

The transmission device can advantageously include at least one scanning signal deflection device having at least one tiltable, pivotable, and/or rotatable scanning signal deflection element. In this way, the propagation direction of the scanning signals in the monitoring region can be swept. The monitoring region can thus be scanned using the scanning signals.

At least one scanning signal deflection element of at least one scanning signal deflection device of the transmission device can advantageously include or consist of a deflection mirror or the like. Deflection mirrors can be implemented easily and robustly.

The transmission device can advantageously include at least one scanning signal deflection device having at least one actuator. A deflection effect of the scanning signal deflection device on scanning signals can be changed using an actuator. A scanning signal deflection element can advantageously be moved, in particular tilted, pivoted, or tilted, using at least one actuator.

At least one actuator can advantageously be electrically controlled. In this way, the scanning signal deflection device can be controlled by means of electrical control means, in particular using at least one control device or control and evaluation device.

At least one actuator can advantageously include at least one electrical drive, in particular a stepping motor, a galvanometer, or the like. Such actuators can be implemented and controlled easily.

At least one scanning signal deflection device can advantageously include or consist of at least one pivot mirror, a micro-electromechanical pivot mirror (MEMS), or the like. Such scanning signal deflection devices can be implemented in a simple and/or space-saving manner. Furthermore, such scanning signal deflection devices can be robustly implemented. In this way, the detection device can also be operated reliably under harsh conditions, for example in or on a vehicle or the like.

In a further advantageous embodiment, multiple beam displacing devices can be arranged one behind another in the manner of a cascade. In this manner, the number of the signal sources, the signal paths of which can be displaced onto a main signal path, can be increased.

Furthermore, the object is achieved according to the invention in the case of the detection device in that the transmission device includes at least two signal sources, which can be activated individually to generate electromagnetic scanning signals, at least one beam displacing device is adjustable between at least two displacement states, wherein the displacement states are assigned to different signal sources, the signal paths of at least two signal sources at the output of the at least one beam displacing device are located on a common main signal path of the transmission device in the displacement states which are respectively assigned to the signal sources.

According to the invention, the detection device includes a transmission device according to the invention, using which scanning signals can be deliberately transmitted into a monitoring region. Reflected electromagnetic scanning signals can be received as electromagnetic echo signals using the reception device. The electromagnetic echo signals can be converted using corresponding receivers of the reception device into electrical reception signals. Information can be obtained from the monitoring region, in particular about objects, on the basis of the received echo signals or the electrical reception signals, respectively. Such information can in particular be distances, directions, and/or speeds of detected objects relative to the detection device.

Advantageously, the detection device can include at least one control device, in particular an electronic control device. The components of the detection device can be controlled electronically in particular using the at least one control device. The at least one transmission device, the at least one reception device, and possibly at least one scanning signal deflection device and/or one echo signal deflection device can thus be activated more deliberately, in particular synchronously.

Alternatively or additionally, the detection device can include at least one evaluation device. In this way, electrical reception signals which are ascertained using the at least one reception device from electromagnetic echo signals can be evaluated.

The evaluation device can include means, using which position variables, in particular distance variables, direction variables, and/or speed variables are ascertained from the electrical reception signals, which can characterize the positions of detected objects, in particular the distance, the direction, and/or the speed relative to the detection device.

Advantageously, control functions of the detection device and evaluation functions for the evaluation of reception signals can be implemented in a centralized manner, in particular by means of a control and evaluation device, or at least partially in a decentralized manner by means of corresponding control means and evaluation means, in particular on software and/or hardware.

In addition, the object is achieved according to the invention in the vehicle in that the transmission device includes at least two signal sources, which can be individually activated to generate electromagnetic scanning signals, at least one beam displacing device is adjustable between at least two displacement states, wherein the displacement states are assigned to different signal sources, the signal paths of at least two signal sources at the output of the at least one beam displacing device are located on a common main signal path of the transmission device in the displacement states which are respectively assigned to the signal sources.

According to the invention, the vehicle includes at least one detection device, using which at least one monitoring region in the surroundings of the vehicle or within the vehicle can be monitored, in particular for objects. The invention enables high measurement frequencies during driving maneuvers at high speeds. Objects can thus be detected reliably even at high driving speeds.

The vehicle can advantageously include at least one driving assistance system. The vehicle can be operated autonomously or at least semiautonomously using the driver assistance system.

Advantageously, at least one detection device can be functionally connected to at least one driver assistance system of the vehicle. In this way, information about the monitoring region, in particular distance variables, direction variables, and/or speed variables, which can be ascertained by the at least one detection device, can be transmitted to the at least one driver assistance system. The vehicle can be operated autonomously or at least semi-autonomously using the at least one driver assistance system in consideration of the information about the monitoring region.

According to the invention, the object is furthermore achieved in the method in that at least two signal sources for generating electromagnetic scanning signals are individually activated, wherein at least one beam displacing device is set to one of at least two displacement states, which are each assigned to at least one active signal source, the signal path of the respective at least one active signal source at the output of the at least one beam displacing device is displaced onto a common main signal path for the at least two signal sources in the respective displacement state, which is assigned to the at least one active signal source in each case.

According to the invention, multiple signal sources are activated in succession for the emission of scanning signals, wherein the at least one beam displacing device is adjusted depending on the respective active signal source so that the signal path of the active signal source is displaced onto the main signal path. In this way, all scanning signals propagate along the main signal path after the at least one beam displacing device independently of the respective active signal source. All scanning signals can thus be transmitted onto the same region of the monitoring region or a further scanning signal deflection device. The measurement frequency in which the detection device can be operated can thus be increased overall.

The control of at least one beam displacing device can advantageously be adapted to the control of at least one signal source. In this manner, the displacement state of the at least one beam displacing device can be adjusted with the change of the respective active signal source.

The activation of the signal sources and the adjustment of the displacement states of the at least one beam displacing device can advantageously be jointly triggered. In this way, the outlay for control signals, in particular trigger signals, can be reduced.

Moreover, the features and advantages indicated in conjunction with the transmission device according to the invention, the detection device according to the invention, the vehicle according to the invention, and the method according to the invention, and the respective advantageous embodiments thereof apply here in a mutually corresponding manner and vice versa. The individual features and advantages can of course be combined with one another, wherein further advantageous effects that go beyond the sum of the individual effects may result.

BRIEF DESCRIPTION OF THE DRAWINGS

Further advantages, features and details of the invention will become apparent from the following description, in which exemplary embodiments of the invention are explained in greater detail with reference to the drawing. A person skilled in the art will expediently also consider individually the features that have been disclosed in combination in the drawing, the description and the claims and will combine them to form meaningful further combinations. In the schematic figures

In the figures, identical components are provided with identical reference signs.

EMBODIMENT(S) OF THE INVENTION

Figure 1:
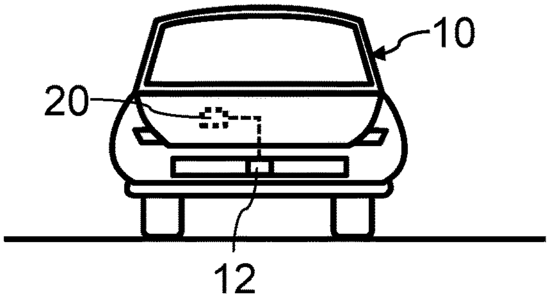
FIG. 1 shows a front view of a vehicle having a driver assistance system and a LiDAR system for detecting objects in the direction of travel in front of the vehicle.

FIG. 1 shows a front view of a vehicle 10 by way of example in the form of a passenger vehicle.

Figure 2:
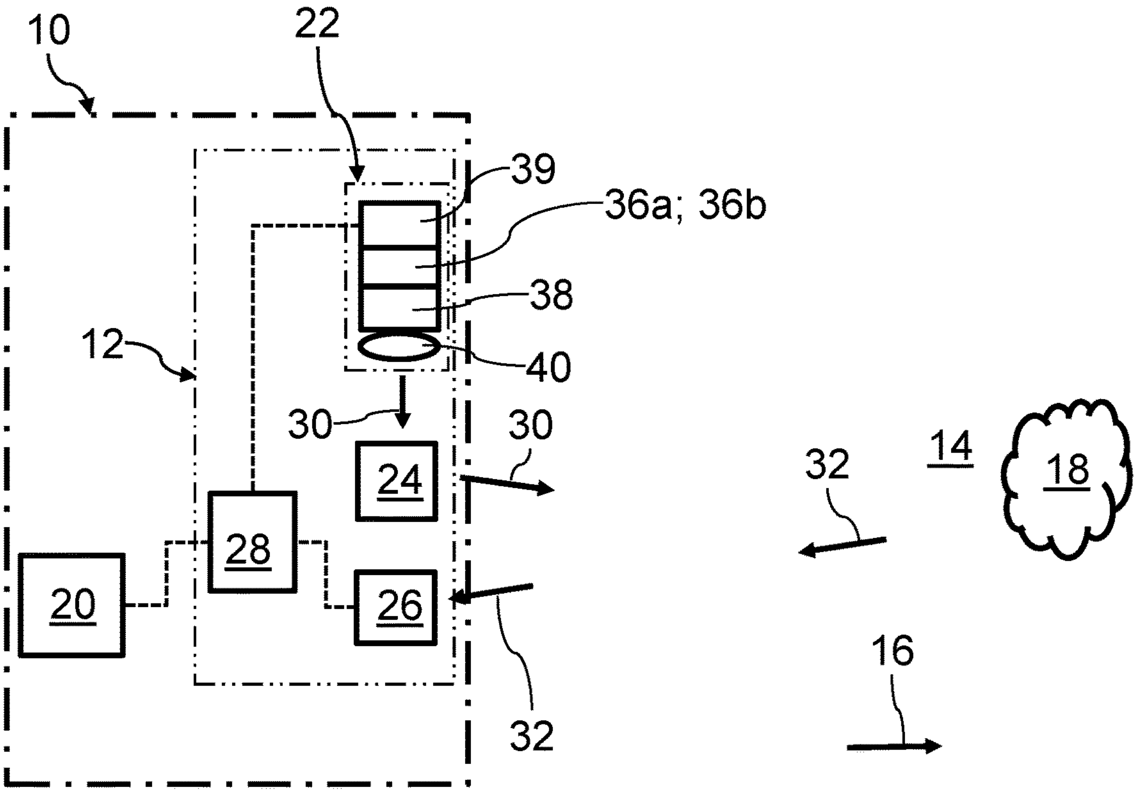
FIG. 2 shows a functional illustration of the vehicle having the driver assistance system and the LiDAR system from FIG. 1.

The vehicle 10 has a detection device by way of example in the form of a LiDAR system 12. The LiDAR system 12 is designed as a laser scanner. FIG. 2 shows a functional illustration of the vehicle 10 having the LiDAR system 12.

By way of example, the LiDAR system 12 is arranged in the front bumper of the vehicle 10. The LiDAR system 12 may be used to monitor a monitoring region 14 in front of the vehicle 10 in the direction of travel 16 for objects 18. The LiDAR system 12 can also be arranged at another location on the vehicle 10 and oriented differently. The LiDAR system 12 can also be arranged in the vehicle 10 for monitoring an interior. The LiDAR system 12 may be used to ascertain object information, for example distances, directions, and speeds of objects 18 relative to the vehicle 10, or to the LiDAR system 12, respectively.

The objects 18 may be stationary or moving objects, for example other vehicles, persons, animals, plants, obstacles, road irregularities, for example potholes or rocks, roadway boundaries, traffic signs, free spaces, for example parking spaces, precipitation or the like. Gestures of persons can also be detected using the LiDAR system 12.

The LiDAR system 12 is connected to a driver assistance system 20. The driver assistance system 20 can be used to operate the vehicle 10 autonomously or semiautonomously.

The LiDAR system 12 comprises, by way of example, a transmission device 22, a scanning signal deflection device 24, a reception device 26, and a control and evaluation device 28.

The functions of the control and evaluation device 28 can be performed in a centralized or decentralized manner. Parts of the functions of the control and evaluation device 28 can also be integrated in the transmission device 22 and/or the reception device 26. The functions of the control and evaluation device 28 are implemented by software and hardware.

Electrical transmission signals are generated using the control and evaluation device 28 to carry out measurements using the LiDAR system 12. The transmission device 22 is activated using the electrical transmission signals, so that it transmits corresponding electromagnetic scanning signals 30 in the form of laser signals.

The scanning signals 30 are transmitted using the transmission device 22 to the scanning signal deflection device 24. The scanning signals 30 are deflected into the monitoring region 14 using the scanning signal deflection device 24, wherein the propagation direction of the scanning signals 30 is changed step-by-step or continuously between measurements. The monitoring region 14 is thus successively scanned using the scanning signals 30.

The electromagnetic scanning signals 30 reflected at an object 18 in the direction of the reception device 26 are received as electromagnetic echo signals 32 using the reception device 26.

The reception device 26 may optionally have an echo-signal deflection device, using which the electromagnetic echo signals 32 are deflected to a receiver of the reception device 26. The receiver can include or consist of, for example, at least one point sensor, at least one line sensor, and/or at least one area sensor, in particular an (avalanche) photodiode, a photodiode line, a CCD sensor, an active pixel sensor, for example a CMOS sensor, or the like.

The electromagnetic echo signals 32 are converted into corresponding electrical reception signals using the receiver. The electrical reception signals are processed using the control and evaluation device 28. For example, object variables, for example, distance variables, direction variables, and speed variables, are ascertained from the electrical reception signals using the control and evaluation device 28, which characterize distances, directions, and speeds of the detected object 18 relative to the LiDAR system 12 or relative to the vehicle 10.

The ascertained object variables are transmitted to the driver assistance system 20 using the control and evaluation device 28. The vehicle 10 is operated autonomously or semiautonomously, inter alia, on the basis of the object variables, using the driver assistance system 20.

Figure 3:
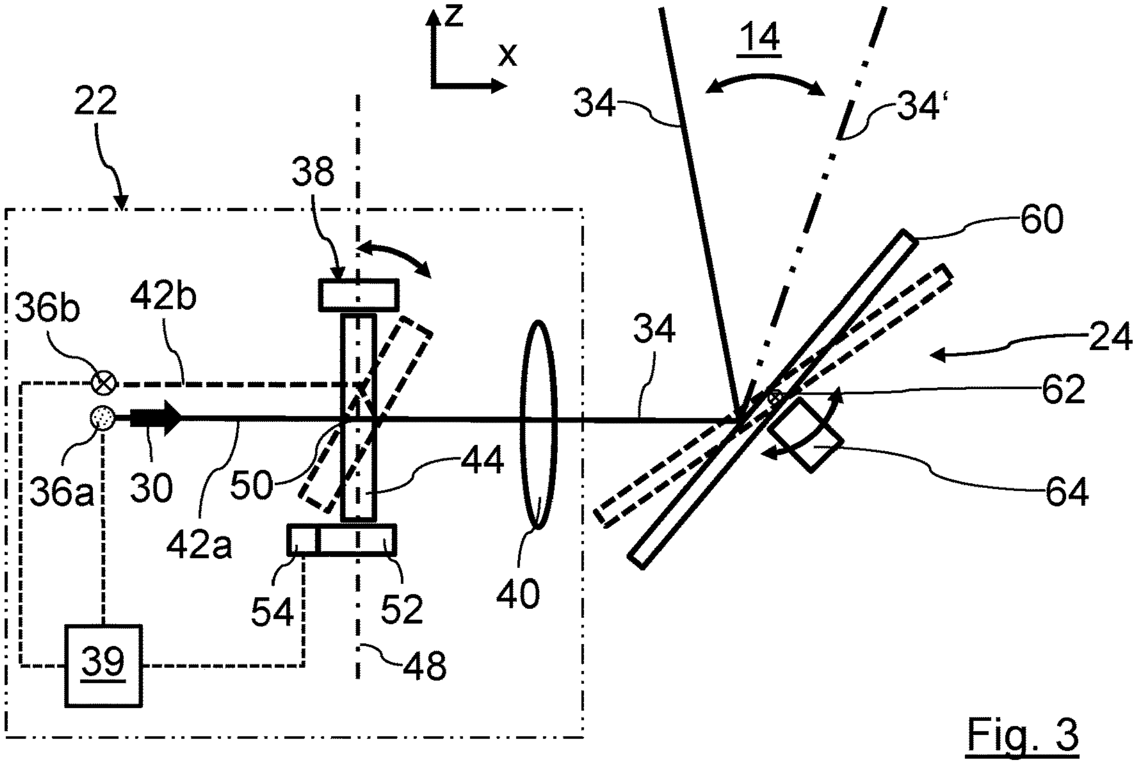
FIG. 3 shows a transmission device and a scanning signal deflection device of the LiDAR system from FIGS. 1 and 2.
Figure 4:
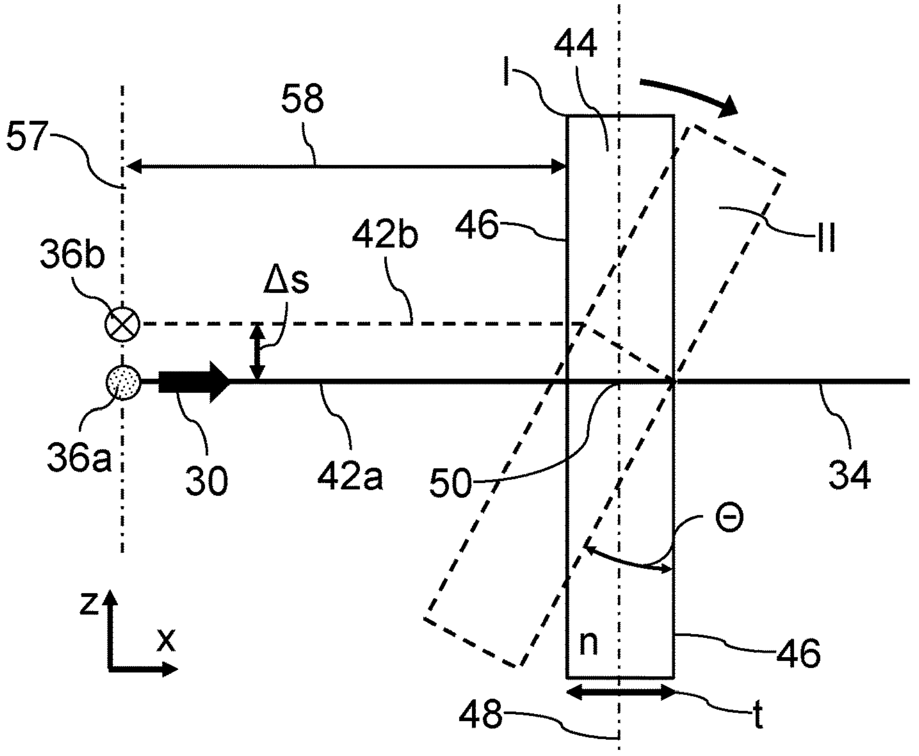
FIG. 4 shows a detail view of the transmission device of the LiDAR system from FIG. 3.

FIG. 3 shows the transmission device 22 and the scanning signal deflection device 24. FIG. 4 shows a detail view of the transmission device 22.

For better orientation, the corresponding coordinate axes of a Cartesian x-y-z coordinate system are shown in FIGS. 3 to 7. In the exemplary embodiments shown in the figures, the x axis extends parallel to a main signal path 34 for the scanning signals 30 at the outlet of the transmission device 22.

Signal paths, namely the main signal path 34 and signal paths 42 of the signal sources explained hereinafter, are the paths of the scanning signals 30 during their propagation. A signal path is characterized by the propagation direction of the scanning signals 30 and the spatial location, in particular in the y-z plane. Upon a displacement of a signal path, the propagation direction of the scanning signals 30 is maintained. Only the location of the signal path, for example, in the y-z plane is changed upon the displacement. Upon pivoting or tilting of a signal path, the propagation direction of the scanning signals 30 is changed.

In a first exemplary embodiment, the transmission device 22 comprises two signal sources 36*a* and 36*b*, a beam displacing device 38, an electrical control unit 39, and an optical lens 40.

The signal sources 36*a* and 36*b* are each designed as laser diodes. The laser diodes include integrated optical lenses, using which the respective generated scanning signals 30 can be focused onto a respective signal path 42*a* and 42*b*.

The beam displacing device 38 is arranged in the signal paths 42*a* and 42*b* of the signal sources 36*a* and 36*b* for the scanning signals 30. The beam displacing device 38 can also be designated as a "beam shifter".

The optical lens 40 is arranged in the main signal path 34 for the scanning signals 30 after the beam displacing device 38. The scanning signals 30 are focused on the scanning signal deflection device 24 using the optical lens 40.

Figure 5:
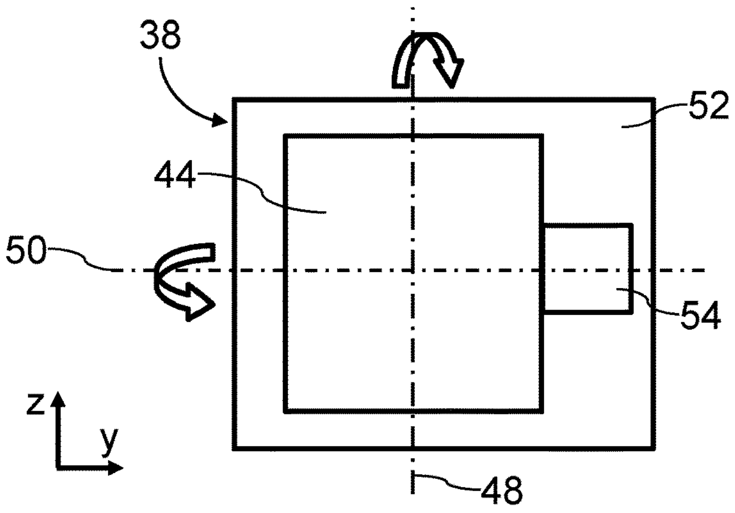
FIG. 5 shows a front view of a beam displacing device of the transmission device from FIGS. 3 and 4.

FIG. 5 shows the beam displacing device 38 in the front view with a direction of observation on its side facing away from the signal sources 36*a* and 36*b*. The beam displacing device 38 comprises a beam displacing device element in the form of a window 44, which is changeable with respect to its displacement effect on the signal paths 42*a* and 42*b*. The window 44 consists of a material that is transmissive to the scanning signals 30, for example glass or plastic. The window 44 is arranged in a transmitting manner in the signal paths 42*a* and 42*b*. The window 44 has two planar surfaces 46 parallel to one another. The signal paths 42*a* and 42*b* extend perpendicularly or transversely to the surfaces 46 depending on the setting of the window 44.

The window 44 is arranged in a frame 52, for example, to be tiltable around a first beam displacing device axis 48 and a second beam displacing device axis 50. The first beam displacing device axis 48 and the second beam displacing device axis 50 extend perpendicularly to one another. For example, the first beam displacing device axis 48 extends parallel to the z axis. The second beam displacing device axis 50 extends parallel to the y axis. In an exemplary neutral position of the window 44, which is shown with a continuous line in FIGS. 3 and 4, the surfaces 46 each extend perpendicular to the signal paths 42*a* and 42*b* of the incident scanning signals 30.

Furthermore, the beam shifter 38 includes an actuator, for example in the form of an electric drive 54. The window 44 can be tilted in the frame 52 around the respective beam displacing device axis 48 and/or 50 using the drive 54.

Figure 6:
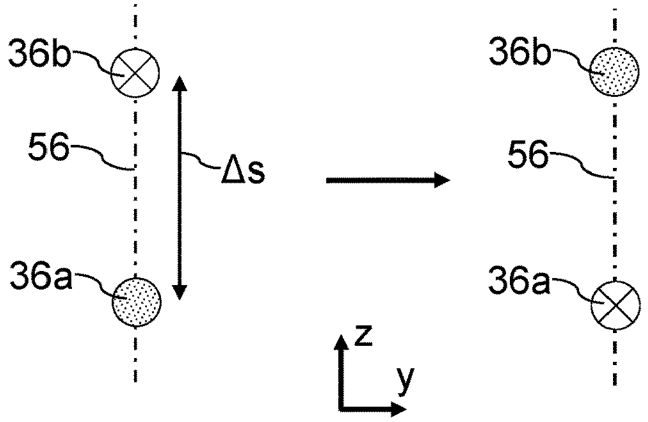
FIG. 6 shows a front view of two signal sources of the transmission device from FIGS. 3 and 4 in two exemplary switching states.

The signal sources 36*a* and 36*b* are arranged adjacent to one another such that their respective signal paths 42*a* and 42*b* extend parallel to one another at a distance As in a plane 56 shown in FIG. 6. FIG. 6 shows the signal sources 36*a* and 36*b* in the front view parallel to their signal paths 42*a* and 42*b* viewed counter to the x axis. The plane 56 extends perpendicular to the second beam displacing device axis 50 of the beam displacing device 38. The output sides of the signal sources 36*a* and 36*b* are arranged in a plane 57 at the same distance 58 to the window 44 of the beam displacing device 38 in its neutral position. The plane 57 extends parallel to the y-z plane and perpendicular to the signal paths 42*a* and 42*b*. The main signal path 34 of the beam displacing device 38 extends in axial extension of the signal path 42*a* of the signal source 36*a* in the exemplary embodiment.

The signal sources 36*a* and 36*b* and the drive 54 of the beam displacing device 38 are connected in a controllable manner to the control unit 39. The control unit 39 is in turn connected to the control and evaluation device 28.

The scanning signal deflection device 24 comprises a deflection element in the form of a deflection mirror 60. The deflection mirror 60 is arranged in a reflective manner in the main signal path 34 of the transmission device 22, thus of the beam displacing device 38. The deflection mirror 60 is pivotable around a mirror pivot axis 62. The mirror pivot axis 62 extends, for example, parallel to the second beam displacing device axis 50 and parallel to the y axis.

The deflection mirror 60 is connected in a drivable manner to an actuator 64, for example in the form of a stepper motor. The actuator 64 is connected for signaling to the control and evaluation device 28. The pivot position of the deflection mirror 60 can be ascertained or specified using the control and evaluation device 28.

FIG. 3 shows the deflection mirror 60 byway of example in two pivot positions in dashed and continuous lines. By changing the pivot position of the deflection mirror 60, the propagation direction of the scanning signals 30 coming from the transmission device 22 and incident on the deflection mirror 60, thus the direction of the main signal path 34, is pivoted in a pivot plane which extends, for example, parallel to the x-z plane. The monitoring region 14 is thus scanned using the scanning signals 30.

A method for operating the LiDAR system 12 is described hereinafter.

To carry out the measurements, the control unit 39 is activated using the control and evaluation device 28. Using the control unit 39, the drive 54 of the beam displacing device 38 is activated so that the window 44 is set to a displacement state in which the signal path of the signal source subsequently activated using the control unit 39 is displaced onto the main signal path 34. The signal sources 36*a* and 36*b* are alternately activated during one or successive measurements and the window 44 is accordingly adjusted between its neutral position and its tilted position.

For example, initially the window 44 is put in its neutral position, which characterizes a first displacement state I. The signal source 36*a* is activated to emit a scanning signal 30. The activation states of the signal sources 36*a* and 36*b* in this measurement phase are shown on the left in FIG. 6. In the neutral position of the window 44, the signal path 42*a* of the signal source 36*a* is perpendicularly incident on the surfaces 46. The signal path 42*a* of the scanning signal 30 is not changed in the neutral position of the window 44. The scanning signal 30 passes through the window 44 in a straight line. After the window 44, the signal path 42*a* of the signal source 36*a* merges into the main signal path 34. The scanning signal 30 is focused using the optical lens 40 on the deflection mirror 60 of the scanning signal deflection device 24. Depending on the pivot position of the deflection mirror 60, the scanning signal 30 is deflected accordingly in the monitoring region 14.

Subsequently, the window 44 is tilted, for example, by a tilt angle θ around the second beam displacing device axis 50 in its tilted position, which characterizes a second displacement state II, which is indicated by dashed lines in FIGS. 3 and 4. The signal source 36*b* is activated to emit a scanning signal 30. The activation states of the signal sources 36*a* and 36*b* in this measurement phase are shown on the right in FIG. 6. The displacement state of the beam displacing device 38 in the tilted position causes the signal path 42*b* of the signal source 36*b* to be displaced by the distance As in parallel to the main signal path 34. The signal path 42*b* of the signal source 36*b* is shown by dashed lines in each of FIGS. 3 and 4. Due to the displacement of the signal path 42*b*, upon activation of the second signal source 36*b*, the corresponding scanning signal 30 also reaches the main signal path 34 through the optical lens 40 on the deflection mirror 60 of the scanning signal deflection device 34.

The following relationship exists between the distance As, the tilt angle θ, a thickness t of the window 44, and an index of refraction n of the window 44.

$$\Delta s = t \sin\Theta\left(1 - \sqrt{\frac{1-\sin^2\Theta}{n^2-\sin^2\Theta}}\right)$$

The thickness t of the window 44 corresponds to the distance between the surfaces 46.

To adjust between the two signal sources 36*a* and 36*b* arranged in the plane 56 perpendicular to the second beam displacing device axis 50, it is only necessary to tilt the window 44 of the beam displacing device 38 in one dimension around the second beam displacing device axis 50.

During operation of the LiDAR system 12, the transmission device 22 or the signal sources 36*a* and 36*b* and the beam displacing device 38 can be activated synchronously with the scanning signal deflection device 24. The scanning signal deflection device 24 can also be activated independently of the transmission device 22.

With a single signal source, the transmission frequency at which scanning signals 30 can be generated in succession is limited for physical reasons. Limiting factors can be in particular limits in the provision of required electrical powers or amperages by corresponding supply components. The exemplary embodiment shown enables two signal sources 36*a* and 36*b* to be activated alternately to generate respective scanning signals 30 and each of the scanning signals 30 to be deflected onto the common main signal path 34 by corresponding setting of the beam displacing device 38. The transmission frequency for scanning signals 30 of the transmission device 22 is thus increased overall in relation to the transmission frequency for scanning signals 30 of the individual signal sources.

The measurement frequency of the LiDAR system 12 is increased overall in relation to operation using only one signal source by the alternate activation of the signal sources 36*a* and 36*b*. Objects 18 are thus reliably detected even during driving maneuvers of the vehicle 10 at high speeds.

Figure 7:
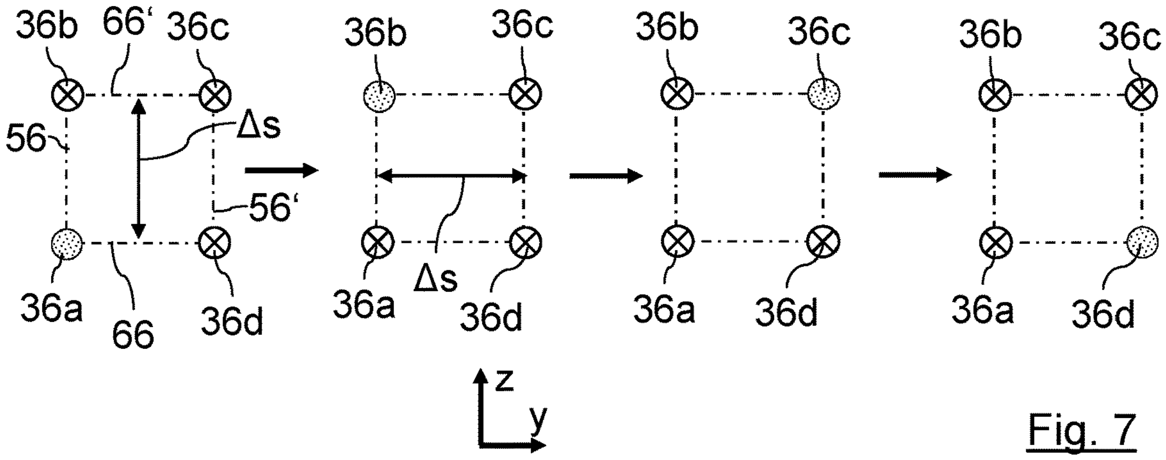
FIG. 7 shows a front view of four signal sources of a transmission device according to a further exemplary embodiment, which can be used in the LiDAR system from FIGS. 1 and 2, in four exemplary switching states.

FIG. 7 shows a second exemplary embodiment having an arrangement of four signal sources 36*a*, 36*b*, 36*c*, and 36*d* for the transmission device 22 in four switching states. FIG. 7 shows the signal sources 36*a*, 36*b*, 36*c*, and 36*d* in the front view parallel to their signal paths observed counter to the x axis.

The signal sources 36*a* and 36*b* are arranged as in the first exemplary embodiment shown in FIG. 6. The signal sources 36*c* and 36*d* are arranged adjacent to the signal sources 36*a* and 36*b* so that their signal paths, which are concealed by the signal paths 42*a* and 42*b* in FIG. 4 and are therefore not shown, extend parallel to one another and parallel to the signal paths 42*a* and 42*b* in a plane 56'.

The plane 56' extends, for example, at the distance As parallel to the plane 56. The signal paths of adjacent signal sources each extend at the same distance As from one another. The signal path 42*a* of the signal source 36*a* extends in a plane 66 with the signal path of the signal source 36*d*. The plane 66 extends perpendicularly to the planes 56 and 56' and perpendicularly to the first beam displacing device axis 48. The signal path 42*b* of the signal source 36*b* extends in a plane 66' with the signal path of the signal source 36*c*. The plane 66' extends perpendicularly to the planes 56 and 56', perpendicularly to the first beam displacing device axis 48, and parallel to the plane 66.

The distances of the output sides of the signal sources 36*c* and 36*d* to the window 44 of the beam displacing device 38 in its neutral position correspond to the distances 58 of the output sides of the signal sources 36*a* and 36*b* to the window 44. The outputs of the signal sources 36*a*, 36*b*, 36*c*, and 36*d* are arranged in the plane 57.

In the exemplary embodiment shown in FIG. 7, the signal sources 36*a*, 36*b*, 36*c*, and 36*d* are activated in succession. Before the respective activation, the window 44 of the beam displacing device 38 is tilted into the corresponding position, so that the signal path 42*a*, 42*b*, 42*c*, or 42*d* of the respective activated signal source 36*a*, 36*b*, 36*c*, or 36*d* is located after the beam displacing device 38 on the main signal path 34.

Before activation of the signal source 36*a*, the window 44 is brought into its neutral position. A scanning signal 30 is then generated using the signal source 36*a*, as shown on the left in FIG. 7.

The window 44 is then tilted around the second beam displacing device axis 50 by the tilt angle Θ. Then, as shown in FIG. 7 in the second illustration from the left, the signal source 36*b* is activated to emit a scanning signal 30.

The window 44 is then pivoted around the first beam displacing device axis 48 by a second tilt angle (not shown in the figures). Then, as shown in FIG. 7 in the third illustration from the left, the signal source 36*c* is activated to emit a scanning signal 30.

The window 44 is thereupon pivoted back around the second beam displacing device axis 50 by the first tilt angle Θ. Then, as shown on the right in FIG. 7, the signal source 36*d* is activated to emit a scanning signal 30.

At the end of the cycle, the window 44 is pivoted around the second beam displacing device axis 50 by the second tilt angle back into its neutral position. A further cycle can then be carried out beginning with the activation of the signal source 36*a* to emit a scanning signal 30.

The measurement frequency of the LiDAR system 12 is increased further in relation to the use of two signal sources 36*a* and 36*b* by the use of four signal sources 36*a*, 36*b*, 36*c*, and 36*d*. The performance of the LiDAR system 12 is thus further improved.

The invention claimed is:

1. A transmission device of a detection device for detecting objects by electromagnetic scanning signals, the transmission device comprising:
- at least one signal source for generating electromagnetic scanning signals and having at least one beam displacing device for displacing signal paths of electromagnetic scanning signals,
- wherein the transmission device includes at least two signal sources, which can be activated individually to generate electromagnetic scanning signals; and
- at least one beam displacing device is adjustable between at least two displacement states, wherein the displacement states are assigned to different signal sources,
- wherein the signal paths of at least two signal sources at the output of the at least one beam displacing device are located on a common main signal path of the transmission device in the displacement states, which are respectively assigned to the at least two signal sources, and
- wherein the at least one beam displacing device includes at least one beam displacing device element, which is movable using at least one controllable actuator to set displacement states.

2. The transmission device as claimed in claim 1,
- wherein the at least one beam displacing device element of at least one beam displacing device is tiltable around at least one beam displacing device axis to set displacement states, or
- wherein the at least one beam displacing device element of at least one beam displacing device is tiltable around two beam displacing device axes, which are in particular orthogonal to one another, to set displacement states.

3. The transmission device as claimed in claim 1,
- wherein the at least one beam displacing device element is at least partially transmissive for the electromagnetic scanning signals, and
- wherein the at least one beam displacing device element is at least partially reflective for the electromagnetic scanning signals.

4. The transmission device as claimed in claim 1, further comprising: at least one control device, using which the at least one beam displacing device and/or the at least two signal sources are controllable.

5. The transmission device as claimed in claim 1,
- wherein at least one control device of the transmission device includes means, using which the at least one beam displacing device and the at least two signal sources can be controlled in a manner adapted to one another.

6. The transmission device as claimed in claim 1,
- wherein the signal paths of the at least two signal sources extend parallel to one another in the propagation direction of the scanning signals in front of the at least one beam displacing device.

7. The transmission device as claimed in claim 1,
- wherein at least one optical system is arranged in the main signal path.

8. The transmission device as claimed in claim 1,
- wherein at least two signal sources are identical with respect to the generated electromagnetic scanning signals.

9. The transmission device as claimed in claim 1,
- wherein the output sides of at least two signal sources are arranged at the same distance to at least one beam displacing device, and
- the output sides of at least two signal sources are arranged along a line which extends transversely and perpendicularly to the signal paths and/or the main signal path, or
- the output sides of at least three signal sources are arranged along a plane, which extends transversely, in particular perpendicularly, to the signal paths and/or the main signal path.

10. The transmission device as claimed in claim 1,
- wherein, with an arrangement of at least three signal sources, the signal paths of adjacent signal sources each extend at the same distance.

11. The transmission device as claimed in claim 1,
- wherein the signal paths of at least two signal sources extend in a plane which extends perpendicular to a beam displacing device axis, around which at least one beam displacing device element of at least one beam displacing device is tiltable, or
- the signal paths of at least two signal sources extend in a plane which extends parallel to a beam displacing device axis, around which at least one beam displacing device element of at least one beam displacing device is tiltable.

12. The transmission device as claimed in claim 1,
- wherein the transmission device includes at least one scanning signal deflection device, which is arranged in the main signal path of the at least one beam displacing device.

13. The transmission device as claimed in claim 1, wherein multiple beam displacing devices are arranged one behind another in a cascade.

14. A detection device for detecting objects by electromagnetic scanning signals, comprising:
- at least one transmission device, which includes at least one signal source for generating electromagnetic scanning signals and at least one beam displacing device for displacing signal paths of electromagnetic scanning signals; and at least one reception device for receiving electromagnetic echo signals, which originate from electromagnetic scanning signals that are reflected at objects;

wherein the transmission device includes at least two signal sources, which can be activated individually to generate electromagnetic scanning signals, wherein at least one beam displacing device includes at least one beam displacing device element, which is movable using at least one controllable actuator to set displacement states, wherein the displacement states are assigned to different signal sources, wherein the signal paths of at least two signal sources at the output of the at least one beam displacing device are located on a common main signal path of the transmission device in the displacement states, which are respectively assigned to the signal sources.

15. A vehicle having at least one detection device for detecting objects by means of electromagnetic scanning signals, comprising:

at least one transmission device, which includes at least one signal source for generating electromagnetic scanning signals and at least one beam displacing device for displacing signal paths of electromagnetic scanning signals; and at least one reception device for receiving electromagnetic echo signals, which originate from electromagnetic scanning signals that are reflected at objects, wherein the transmission device includes at least two signal sources, which can be activated individually to generate electromagnetic scanning signals, wherein at least one beam displacing device includes at least one beam displacing device element, which is movable using at least one controllable actuator to set displacement states, wherein the displacement states are assigned to different signal sources, wherein the signal paths of at least two signal sources at the output of the at least one beam displacing device are located on a common main signal path of the transmission device in the displacement states, which are respectively assigned to the signal sources.

16. A method for operating a transmission device of a detection device for detecting objects by electromagnetic scanning signals, the method comprising:

generating electromagnetic scanning signals using at least one signal source; and displacing a signal path of at least one electromagnetic scanning signal using at least one beam displacing device, wherein at least two signal sources for generating electromagnetic scanning signals are activated individually, wherein at least one beam displacing device includes at least one beam displacing device element, which is movable using at least one controllable actuator to set displacement states, wherein the at least one beam displacing device is set to one of at least two displacement states, which is assigned to the respective at least one active signal source, and wherein the signal path of the respective at least one active signal source at the output of the at least one beam displacing device is displaced onto a common main signal path for the at least two signal sources in the respective displacement state, to which the at least one active signal source is respectively assigned.

* * * * *